(12) United States Patent
Kim et al.

(10) Patent No.: US 8,125,590 B2
(45) Date of Patent: Feb. 28, 2012

(54) OPTICAL FILM, BACKLIGHT UNIT INCLUDING THE SAME AND LIQUID CRYSTAL DISPLAY DEVICE HAVING THE SAME

(75) Inventors: Yongsu Kim, Cheongju (KR); Seungho Lee, Cheongju (KR); Changjong Kim, Cheongju (KR); Seungwook Kwon, Cheongju (KR); Kabjin Hwang, Cheongju (KR); Cheol Yoon, Cheongju (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/599,180

(22) PCT Filed: Dec. 6, 2007

(86) PCT No.: PCT/KR2007/006330
§ 371 (c)(1),
(2), (4) Date: Jul. 6, 2010

(87) PCT Pub. No.: WO2008/140164
PCT Pub. Date: Nov. 20, 2008

(65) Prior Publication Data
US 2010/0265434 A1    Oct. 21, 2010

(30) Foreign Application Priority Data
May 9, 2007  (KR) .................. 10-2007-0045123

(51) Int. Cl.
G02B 5/02 (2006.01)
G02F 1/13357 (2006.01)
B32B 5/16 (2006.01)

(52) U.S. Cl. .......... 349/64; 428/323; 428/143; 362/97.2
(58) Field of Classification Search ............... 349/62, 349/64; 428/323, 143
See application file for complete search history.

(56) References Cited

U.S. PATENT DOCUMENTS

| | | | |
|---|---|---|---|
| 6,327,088 | B1 | 12/2001 | Iwata et al. |
| 6,692,647 | B2 | 2/2004 | Moshrefzadeh et al. |
| 6,871,994 | B2 | 3/2005 | Harada et al. |
| 6,890,642 | B2 | 5/2005 | Kaminsky et al. |
| 7,223,452 | B2 | 5/2007 | Murakami et al. |
| 7,717,604 | B2 * | 5/2010 | Mai ............................... 362/620 |
| 7,906,184 | B2 | 3/2011 | Umemoto et al. |
| 2004/0061944 | A1 * | 4/2004 | Kashima et al. .............. 359/599 |
| 2006/0134420 | A1 * | 6/2006 | Poncet-Legrand et al. ... 428/403 |
| 2007/0230178 | A1 * | 10/2007 | Mai .............................. 362/264 |

FOREIGN PATENT DOCUMENTS

| | | | |
|---|---|---|---|
| KR | 10-2005-0096548 | * | 4/2007 |
| KR | 10-2007-0040957 | * | 4/2007 |
| KR | 10-2007-0040957 A | | 4/2007 |
| KR | 10-2008-0019903 | * | 3/2008 |
| KR | 10-2008-0019903 A | | 3/2008 |
| TW | I263847 B | | 10/2006 |
| TW | I274918 B | | 3/2007 |

* cited by examiner

Primary Examiner — David Nelms
Assistant Examiner — Sang Nguyen
(74) Attorney, Agent, or Firm — Birch, Stewart, Kolasch & Birch, LLP

(57) ABSTRACT

An optical film, a backlight unit having the same, and a liquid crystal display device having the same are disclosed. The optical film comprises a base film and a plurality of structures disposed on the base film, at least one of the structures comprising a plurality of beads with a diffusion portion having a first diameter and a transmission portion having a second diameter integrally formed with each other.

18 Claims, 5 Drawing Sheets

OPTICAL FILM, BACKLIGHT UNIT INCLUDING THE SAME AND LIQUID CRYSTAL DISPLAY DEVICE HAVING THE SAME

TECHNICAL FIELD

This document relates to a display device, and more particularly, to an optical film, a backlight unit having the same, and a liquid crystal display device having the same.

BACKGROUND ART

A liquid crystal display (hereinafter, referred to as "LCD") device is an electronic device changing and conveying various electric information generated from various apparatuses to visual information by using change of transmittance of liquid crystals according to an applied voltage.

The LCD device is a device displaying information, but has no self-light emitting source. Thus, the LCD device needs a separate device in the backside in order to brighten the whole screen of the LCD device uniformly. The device providing a light is a backlight unit.

According to the installation method of cold cathode fluorescent lamp (hereinafter, referred to as "CCFL"), the BLU may be made in two methods: a direct-light method in which a lamp is located under an LCD panel, and an edge-light method in which a lamp is disposed on the side of a light guide plate.

Figure 1:
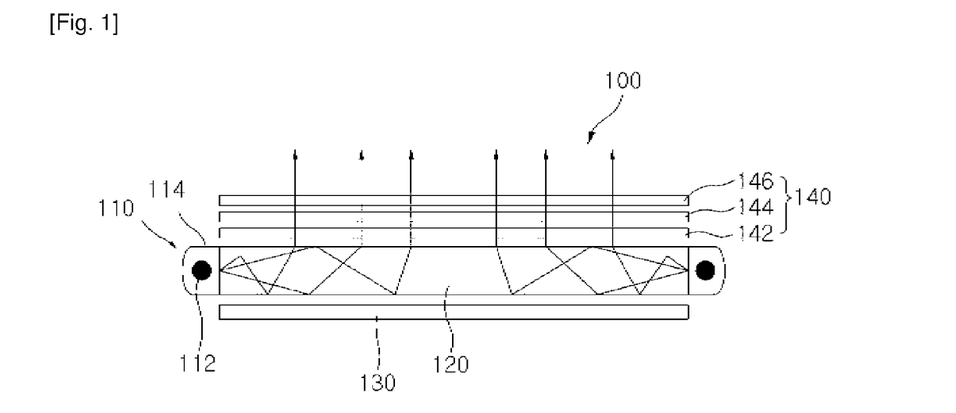
FIG. 1 is a cross-cross-sectional view illustrating a conventional backlight unit of a
LCD device.

FIG. 1 is a cross-cross-sectional view illustrating a conventional backlight unit of a LCD device.

Referring to FIG. 1, the backlight unit is driven by the edge-light method, and comprises a light source unit 110, a light guide plate 120, a reflection sheet 130, and an optical film 140.

The light source unit 110 comprises at least one light source 112 and a light source reflection plate 114.

The light source 112 generates a light having a predetermined wavelength.

The light generated from the light source 112 is reflected by the light source reflection plate 114 and the reflection sheet 130. Then, as shown in FIG. 1, the reflecting light is diffused uniformly through the light guide plate 120.

The optical film 140 comprises a diffusion sheet 142, a prism sheet 144 and a protection sheet 146.

The light which is diffused uniformly in the light guide plate 120 passes through the diffusion sheet 142. The diffusion sheet 142 diffuses or concentrates the light passed through the light guide plate 120, thereby making luminance uniformly, and widening the viewing angle of the LCD.

The luminance of light passed through the diffusion sheet 142 is decreased rapidly. To prevent it, a prism sheet 144 is used. The prism sheet 144 refracts the light emitted from the diffusion sheet 142 in a low angle to collimate the light toward the front direction so that the luminance is improved within the effective viewing angle.

The protection sheet 146 is disposed on the prism sheet 144, and prevents the prism sheet 144 from scratch, and widens the viewing angle narrowed by the prism sheet 144.

DISCLOSURE OF INVENTION

Technical Problem

The optical film 140 is comprised of several sheets such as the diffusion sheet 142, the prism sheet 144, and the protection sheet 146, thus the backlight unit 100 is thick.

Technical Solution

An aspect of this document is to provide an optical film which performs both a light concentrating function and a light diffusion function and improves luminance and viewing angle, a backlight unit having the same, and a liquid crystal display device having the same.

In another aspect, there is provided an optical film which can improve transmittance without decreasing luminance, a backlight unit having the same, and a liquid crystal display device having the same.

In one aspect, an optical film comprises a base film and a plurality of structures disposed on the base film, at least one of the structures comprising a plurality of beads with a diffusion portion having a first diameter and a transmission portion having a second diameter integrally formed with each other.

In another aspect, an optical film comprises a base film and a plurality of structures disposed on the base film. At least one of the structures comprises a plurality of beads with a diffusion portion having a first diameter and a transmission portion having a second diameter integrally formed with each other. And the height of at least one of the structures varies at random or regular intervals along the longitudinal direction of the structure.

In still another aspect, a backlight unit comprises a light source and an optical film on which the light emitted from the light source is incident. The optical film comprising a base film and a plurality of structures disposed on the base film. And at least one of the structures comprises a plurality of beads with a diffusion portion having a first diameter and a transmission portion having a second diameter integrally formed with each other.

In still another aspect, a liquid crystal display device comprises a liquid crystal panel, a light source and an optical film positioned between the liquid crystal panel and the light source. The optical film comprising a base film and a plurality of structures disposed on the base film, at least one of the structures comprising a plurality of beads with a diffusion portion having a first diameter and a transmission portion having a second diameter integrally formed with each other.

Advantageous Effects

As described above in detail, the optical film, the backlight unit having the same, and the liquid crystal display device having the same in accordance with an exemplary embodiment of the present invention can perform both a light condensing function and a light diffusion function and improve luminance and viewing angle.

Besides, transmittance can be improved without decreasing luminance.

BEST MODE FOR CARRYING OUT THE INVENTION

Figure 2:
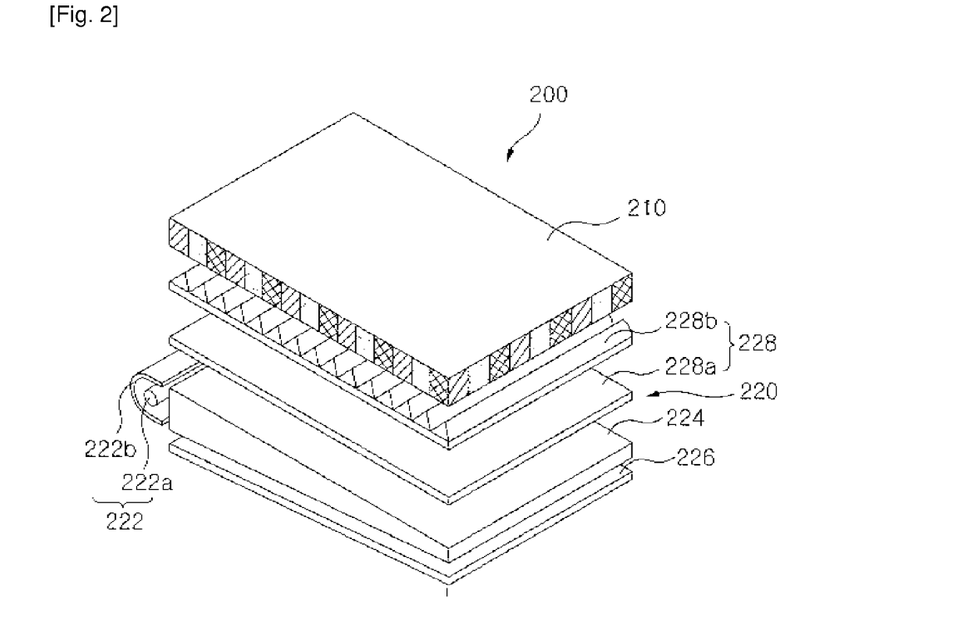
FIG. 2 is a view showing a liquid crystal display device using an edge-light type backlight unit in accordance with an exemplary embodiment of the present invention.
Figure 3:
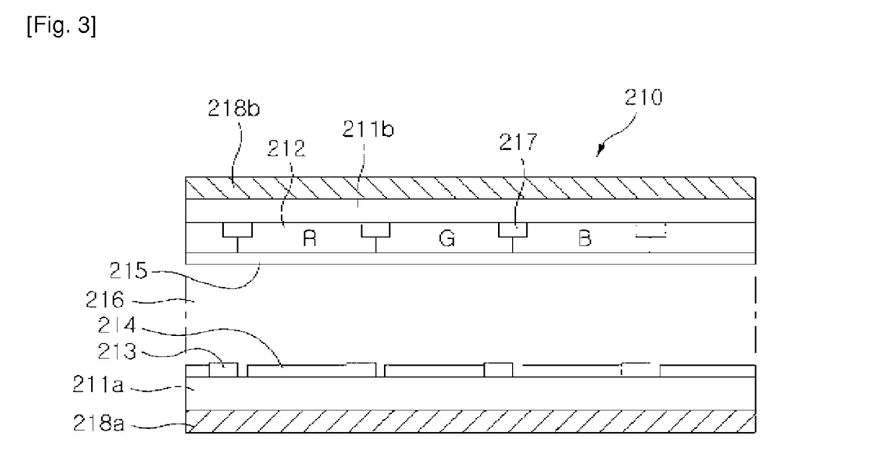
FIG. 3 is a view showing a liquid crystal display panel in accordance with an exemplary embodiment of the present invention.

FIG. 2 is a view showing a liquid crystal display device using an edge-light type backlight unit in accordance with an exemplary embodiment of the present invention. FIG. 3 is a view showing a liquid crystal display panel in accordance with an exemplary embodiment of the present invention.

Referring to FIGS. 2 and 3, a liquid crystal display (hereinafter, referred to as "LCD") device 200 comprises a liquid crystal panel 210 displaying an image according to driving signals and data signals applied from the outside and a backlight unit 220 disposed on the back surface of the liquid crystal panel 210 for lighting the liquid crystal panel 210.

The liquid crystal panel 210 comprises an upper substrate 211b, a lower substrate 211a, a color filter 212, a black matrix 217, a pixel electrode 214, a common electrode 215, a liquid crystal layer 216, and a TFT array 213. A pair of polarization films 218a and 218b is disposed on both sides of the liquid crystal panel 210.

The color filter 212 comprises a plurality of pixels comprised of red (R), green (G), and blue (B) subpixels, and when a light is entered, the color filter 212 generates images corresponding to red, green and blue.

Although the pixels are generally comprised of red (R), green (G), and blue (B) subpixels, they are not necessarily limited thereto, but they may be configured in various combinations, for example, red, green, blue, and white (W) subpixels form one pixel.

The TFT array 222 is a switching device, and switches the pixel electrode 214.

The common electrode 215 and the pixel electrode 214 change the arrangement of liquid crystal molecules in the liquid crystal layer 216 according to applied voltages.

The liquid crystal layer 216 consists of a plurality of liquid crystal molecules. The liquid crystal molecules change their arrangement with the voltage difference generated between the pixel electrode 214 and common electrode 215, thereby the light provided from the backlight unit 220 is input into the color filter 212 conforming to the change of the arrangement of molecules in the liquid crystal layer 216.

The backlight unit 220 is disposed at the back of the liquid crystal panel 210 to provide light, for example white light, to the liquid crystal panel 210.

According to the installation method of cold cathode fluorescent lamp (hereinafter, referred to as "CCFL"), the BLU may be made in two methods: a direct-light method in which a lamp is located under an LCD panel, and an edge-light method in which a lamp is disposed on the side of a light guide plate.

In FIG. 2, the backlight unit 220 is driven by the edge-light method, and comprises a light source unit 222, a light guide plate 224, a reflection sheet 226, and an optical film 228.

The light source unit 222 is disposed on the side of the backlight unit 220, and comprises at least one light source 222a and a light source reflection plate 222b.

As the light source 222a, a cold cathode fluorescent lamp (CCFL) is used. The CCFL is a lamp which can provide a very bright white light.

In addition to the CCFL, a light emitting diode (LED) or an external electrode fluorescent lamp (EEFL) may be used as the light source 222a.

The LED may be of red, green, and blue, or may be of a single color of white light. In the backlight unit 220 using the LED as a light source, the backlight unit 220 can be smaller, the efficiency of light can be improved, and the uniformity of light can be maintained.

The EEFL has a superior luminance to the CCFL, and is advantageous to be operated in parallel because electrodes are placed outside. Especially, the EEFL can cut down the cost of parts and reduce the weight of an LCD module since the number of inverters required in an existing light source can be reduced.

The light source reflection plate 222b covers the light source 222a, and enhances the light efficiency by inducing a light emitted from the light source 222a to enter the side of the light guide plate 224. Thus, the light source reflection plate 222b is made up of a highly reflective material, and may have silver (Ag) coating on the surface.

The reflection sheet 226 is disposed under the light guide plate 224, and reflects a light emitted from the light source 222a over the entire surface of the light guide plate 310.

The light guide plate 224 is designed so that continuous total reflection of a light incident from the side is possible below a critical angle. The light source 220 is disposed on the side of the backlight unit 220, and thus the light emitted from the light source 222a is not transmitted to the whole surface of the backlight unit 220 uniformly, but condensed on the edge.

Accordingly, the light guide plate 224 is needed to transmit a light to the whole surface uniformly. Generally, the light guide plate 224 is made of a transparent acrylic resin, for example, poly methyl meta acrylate (PMMA). The PMMA has high toughness, and thus is not broken easily, is light and less deformed, and has high transmittance of visible rays.

Also, the light guide plate 224 induces a light to proceed to the direction of the liquid crystal panel 210.

The optical film 228 may comprise, for example, a diffusion sheet 228a and a prism sheet 228b.

The light emitted from the light guide plate 224 toward the liquid crystal panel 210 passes through the diffusion sheet 228a. The diffusion sheet 228a disperses the light incident from the light guide plate 224, to thereby prevent a partial concentration of the light, make the luminance uniform, and widen the viewing angle.

The luminance of the light transmitted from the diffusion sheet 228a is decreased abruptly. To prevent it, the prism sheet 228b is used.

The prism sheet 228b condenses some of the light diffused by the diffusion sheet 228a in a direction of the liquid crystal panel, and reflects the other part of the light in a direction to the diffusion sheet 228a. A detailed construction of the prism sheet 228b will be described later.

Although the above description has been made with respect to a case in which the optical film 228 comprises a diffusion sheet 228a and a prism sheet 228b, the optical film 228 may further comprise a protection sheet (not shown), and there is no limitation that the protection sheet may be included instead of the diffusion sheet 228a.

The protection sheet is disposed on the prism sheet 228b, prevents the prism sheet 228b from scratch, and widens the viewing angle which is narrowed by the prism sheet 228b.

Alternatively, it is possible to provide light to the liquid crystal panel 210 by using a direct-light type backlight unit, as well as the above-described edge-light type backlight unit 220.

Figure 4:
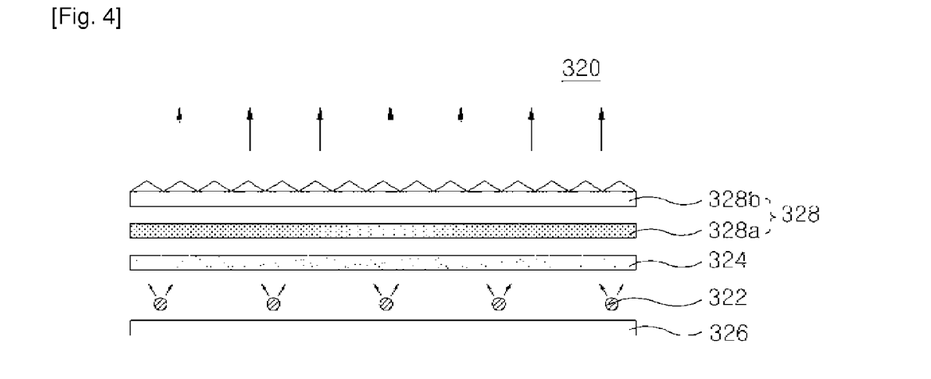
FIG. 4 is a view showing a direct-light type backlight unit in accordance with another exemplary embodiment of the present invention.

FIG. 4 is a view showing a direct-light type backlight unit in accordance with another exemplary embodiment of the present invention.

Referring to FIG. 4, the backlight unit 320 is driven by a direct-light method, and comprises a light source unit 322, a diffusion plate 324, a reflection sheet 326, and an optical film 328.

The light source 322 comprises a plurality of Cold Cathode Fluorescent Lamps (CCFL). The CCFL is a lamp which can provide a very bright white light.

In addition to the CCFL, a light emitting diode (LED) or an external electrode fluorescent lamp (EEFL) may also be used as the light source 322.

The reflection sheet 326 is disposed under the diffusion plate 324, and reflects a light emitted from the light source 322 toward the front direction of the diffusion plate 324.

Alternatively, a light source reflection plate (not shown), instead of the reflection sheet 326, is disposed under the light source 322 to cover the light source 322, and enhances the light efficiency by inducing a light emitted from the light source 322 to enter the diffusion sheet 328a. Thus, the light source reflection plate is made up of a highly reflective material, and may have silver (Ag) coating on the surface.

The diffusion plate 324 transmits the light incident from the light source 322. The diffusion plate 324 may be made up of poly methyl meta acrylate (PMMA).

The optical film 328 may comprise, for example, a diffusion sheet 328a and a prism sheet 328b.

The light exiting from the diffusion plate 324 toward the liquid crystal panel 210 passes through the diffusion sheet 328a. The diffusion sheet 328a disperses the light incident from the diffusion plate 324, to thereby prevent a partial concentration of the light, and make the luminance uniform.

The luminance of the light transmitted from the diffusion sheet 328a is decreased abruptly. To prevent it, the prism sheet 328b is used. The prism sheet 328b condenses some of the light diffused by the diffusion sheet 328a in a direction of the liquid crystal panel 210, and reflects the other part of the light in a direction to the diffusion sheet 328a. A detailed construction of the prism sheet 328b will be described later.

Hereinafter, the light emitting operation of the LCD device 200 is described.

Again, in FIG. 3, the backlight unit 220 and 320 provides a plane light, white light, to the liquid crystal panel 210.

Subsequently, the TFT array 213 switches the pixel electrode 214.

And, a certain voltage difference is applied between the pixel electrode 214 and the common electrode 215. As a result, the liquid crystal layer 216 is arrayed in correspondence to each of the red, green and blue subpixels.

In this case, the amount of the plane light provided from the backlight unit 220 and 320 is controlled when it passes through the liquid crystal layer 216, and such controlled light is transmitted to the color filter 212.

As a result, the color filter 212 displays images with variable gray level.

Specifically, the red subpixel, green subpixel, and blue subpixel form one pixel, and the pixel displays images by mixing lights transmitted through the red, green and blue subpixels.

Hereinafter, the structure of the optical film 228 and 328, especially, the prism sheet 228b and 328b, will be described.

Figure 5:
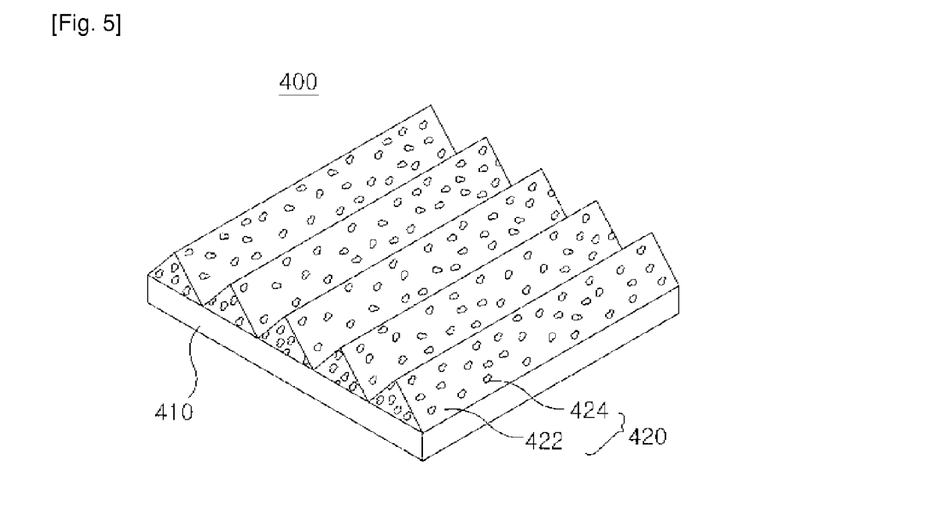
FIGS. 5 and 6 are views showing the structure of an optical film in accordance with an exemplary embodiment of the present invention.
Figure 6:
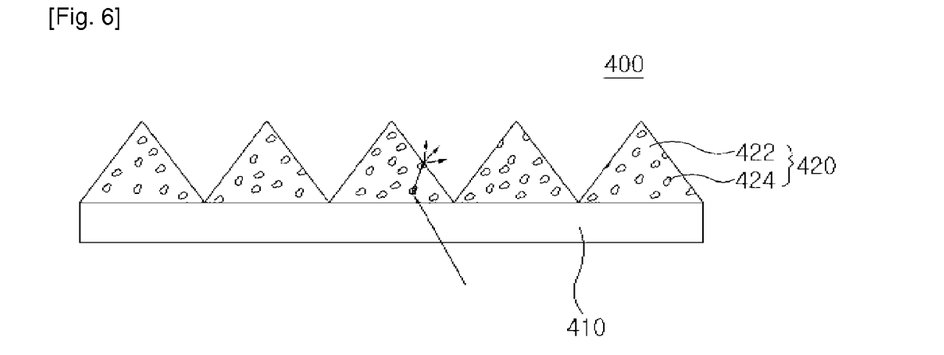
Figure 7:
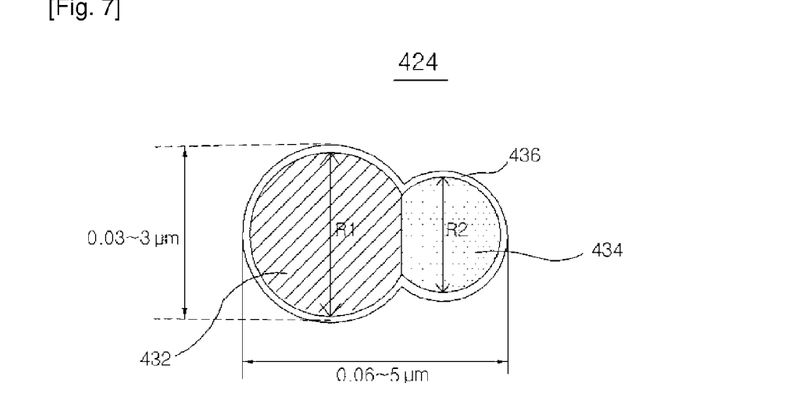
FIG. 7 is a cross sectional view showing the structure of a bead of a snowman shape of FIGS. 5 and 6.
Figure 8:
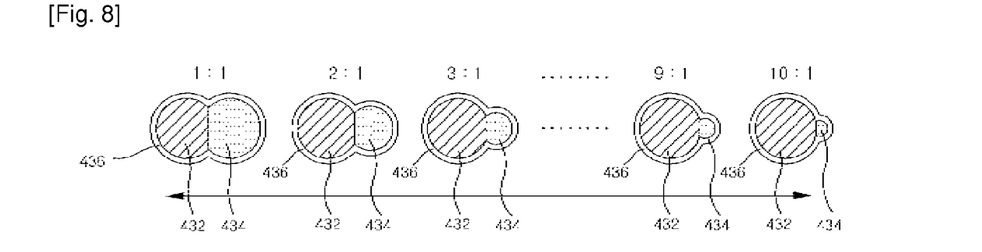
FIG. 8 is a view showing the structure of the bead of FIG. 7 according to the diameters of a diffusion portion and a transmission portion.

FIGS. 5 and 6 are views showing the structure of an optical film in accordance with an exemplary embodiment of the present invention. FIG. 7 is a cross sectional view showing the structure of a bead of a snowman shape of FIGS. 5 and 6. FIG. 8 is a view showing the structure of the bead of FIG. 7 according to the diameters of a diffusion portion and a transmission portion.

Referring to FIGS. 5 and 6, an optical film 400, for example, a prism sheet 228b and 328b, in accordance with an exemplary embodiment of the present invention comprises a base film 410 and a plurality of structures formed on the base film 410, and the structures 420 are formed in a row to constitute one structure. Although description is made about the case in which the structures are formed in a row, this invention is not limited thereto, but a plurality of structures may be arranged in various arrangement methods.

Like this, one surface of the optical film 400 is structured as a plurality of structures 420, and the opposite surface thereof may be the base film 410 which is smoothly formed.

The base film 410 may be made of a thermoplastic polymer film which is transparent, flexible, and has an excellent processability. For example, the base film 410 may be formed of PET (polyethylene terephthalate), polyester, PMMA (polymethyl meta acrylate), PC (poly carbornate), and so forth.

The plurality of structures 420 are disposed side by side on the base film 410, and their cross sections have a prism shape. The prism shape comprises a regular triangle, an isosceles triangle, inequilateral triangle, etc. A vertical angle of the prism is generally 90°, but may be varied according to a selection.

In this way, the plurality of structures 410 are continuously formed to form valleys and peaks alternately. The thus-constructed structures 420 refract light incident through the base film 410. Accordingly, the light incident in a low angle is collimate toward the front direction so that the luminance is improved within the effective viewing angle.

Also, the structures 420 are formed by using resin 422 including a plurality of beads 424. The structures comprise 0.1 to 10 parts by weight of beads 424 with respect to 100 parts by weight of resin 422. They may comprise 0.1 to 5 parts by weight of beads 424 with respect to 100 parts by weight of resin 422.

As the resin 422, for example, a UV curing resin may be used.

Referring to FIG. 7, the plurality of beads 424 comprise a diffusion portion 432 made of a light diffusing material and a transmission portion 434 made of a light transmitting material, and are formed in a snowman shape.

A coating film 436 is formed on the surface of the bead 424 so as to cover both of the diffusion portion 432 and the transmission portion 434. The coating film 436 can prevent the resin 422 from penetrating into the bead 424, and accordingly prevent the properties of the diffusion portion 432 and the transmission portion from being changed.

In the bead 424, as shown in FIG. 7, the diffusion portion 432 has a first diameter R1, the transmission portion 434 has a second diameter R2, and the diffusion portion 432 and the transmission portion 434 are integrally formed with each other.

The first diameter R1 of the diffusion portion 432 ranges from 0.03 ☐ to 3☐, and the entire length of the bead ranges from 0.06 ☐ to 5☐.

The bead 424 performs the function of diffusing an incident light to the optical film 400 by the diffusion portion 432 and the function of transmitting light by the transmission portion 434.

Some of the light entering the structures 420 of the optical film 400 is concentrated, and as shown in FIG. 8, some thereof passes through the beads 424 in the structures 420.

Among the light passing through the beads 424, the light entering the diffusion portion 432 is scattered to diffuse the light on the entire surface of the optical film 400, to thereby prevent a partial concentration of the light, make the luminance uniform, and improve the viewing angle.

Further, among the light passing through the beads 424, the light entering the transmission portion 434 passes through the beads 424 as they are, and is condensed as it collides with one surface of the structures 420.

As above, the optical film 400 in accordance with an exemplary embodiment of the present invention performs the function of condensing light by the structures 420 of a prism shape and the function of diffusing light by the beads 424 in the structures 420.

Moreover, as the beads 424 are formed in a snowman shape which allows them to perform both diffusion function and transmission function, luminance or total transmittance may not be degraded even if the diffusion function is performed.

In the beads 424, as shown in FIG. 8, the ratio of the first diameter R1 of the diffusion portion 432 to the second diameter R2 of the transmission portion 434 ranges from 1:1 to 10:1.

If the first diameter R1 of the diffusion portion 432 and the second diameter R2 of the transmission portion 434 are the same (1:1), the probability that the light entering the optical film 400 is transmitted as it enters the beads 424 increases, thereby relatively increasing luminance and total transmittance.

In contrast, if the first diameter R1 of the diffusion portion 432 is greater than the second diameter R2 of the transmission portion 434 (maximum 10:1), the probability that the light entering the optical film 400 is diffused as it enters the beads 424 increases, thereby increasing haze.

By forming the beads 424 in such a ratio, the function of diffusing light can be efficiently performed without reducing the luminance and total transmittance of the light passing through the optical film 400.

Meanwhile, in the optical film in accordance with an exemplary embodiment of the present invention, the structures 420 are formed of a composition comprising the resin 422 and the beads 424, so that the beads 424 may be located within the structures 420, or the beads may be located on the outer surfaces of the structures by forming the structures of resin and dispersing the beads outside the structures.

Mode for the Invention

Hereinafter, an optical film in accordance with another exemplary embodiment of the present invention will be described.

Figure 9:
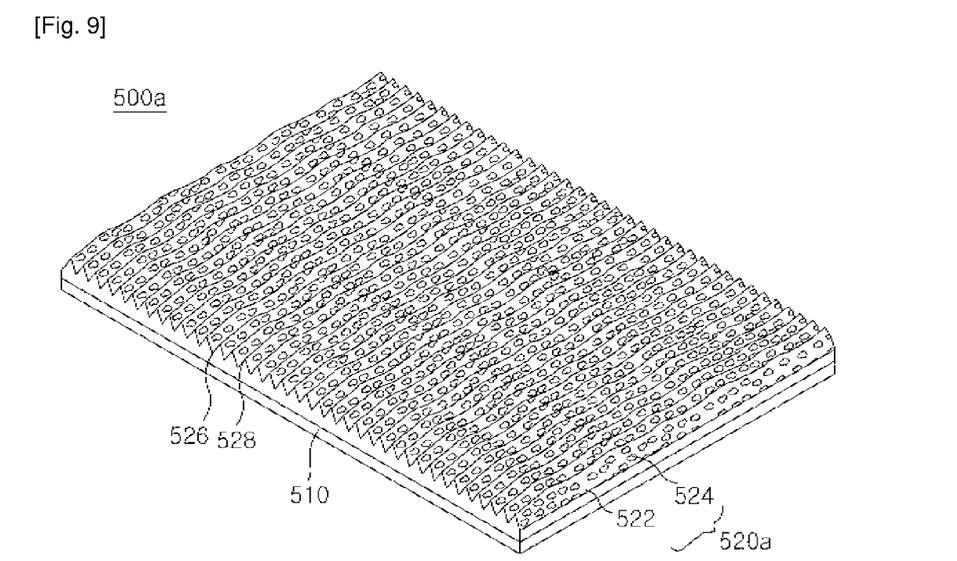
FIGS. 9 and 10 are perspective views schematically showing the structure of an optical film in accordance with another exemplary embodiment of the present invention.
Figure 10:
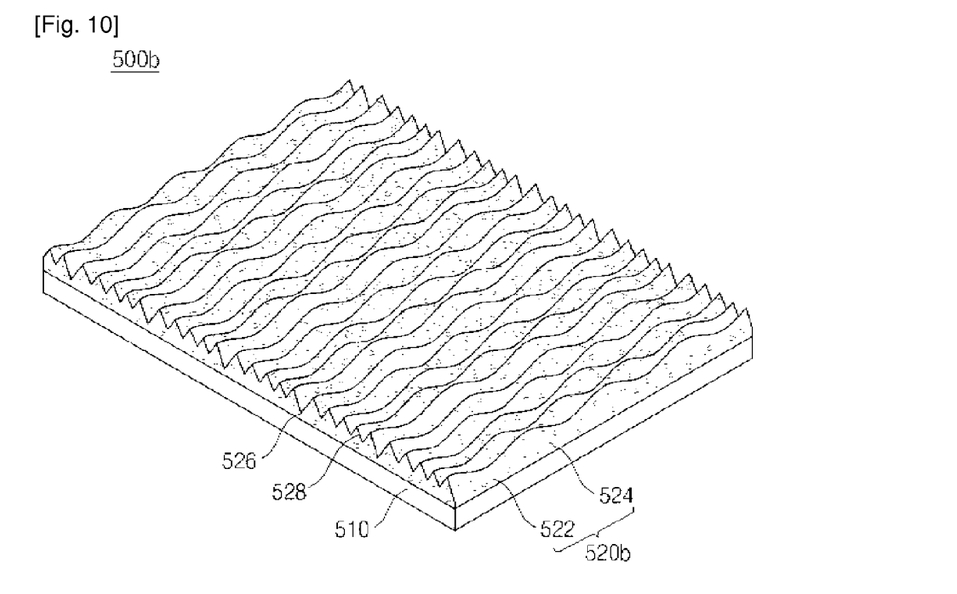

FIGS. 9 and 10 are perspective views schematically showing the structure of an optical film in accordance with another exemplary embodiment of the present invention.

Referring to FIGS. 9 and 10, an optical film 500 (500a and 500b), for example, a prism sheet 228b and 328b comprises a base film 510 and a plurality of structures 520 (520a and 520b) formed on the entire surface of the base film 510.

Like this, one surface of the optical film 500 structured as a plurality of structures 520, and the opposite surface thereof may be the base film 510 which is smoothly formed.

The base film 510 may be made of a thermoplastic polymer film which is transparent, flexible, and has an excellent processability. For example, the base film 510 may be formed of PET (polyethylene terephthalate), polyester, PMMA (polymethyl meta acrylate), PC (poly carbornate), and so forth.

The plurality of structures 520 are disposed side by side on the base film 510, and peaks 528 and/or valleys 526 of the structures 520 may form a continuous curve. The continuous curve formed on the peaks 528 and/or valleys 526 of the structures 520 may be formed randomly or at regular intervals.

Further, side portions of each structure 520, as well as the peaks 528 and/or peaks 526 of each structure 520, may be formed to be curved, too.

A cross section of the structure 520 may have a prism shape. Also, it may have a isosceles right triangle shape with a vertical angle of 90°. A cross section of the structure 520 may be curved at both sides, but not curved at the bottom surface.

Also, the structures 520 are formed by using resin 522 including a plurality of beads 524. The structures may comprise 0.1 to 10 parts by weight of beads 524 with respect to 100 parts by weight of resin 522. They may comprise 0.1 to 5 parts by weight of beads 524 with respect to 100 parts by weight of resin 522.

Hereinafter, the constructions and characteristics of the plurality of beads 524 and resin 522 comprising the structures 520 are identical to those of the structures 420 of the optical film in accordance with an exemplary embodiment of the present invention, thus a description thereof will be omitted.

Figure 11:
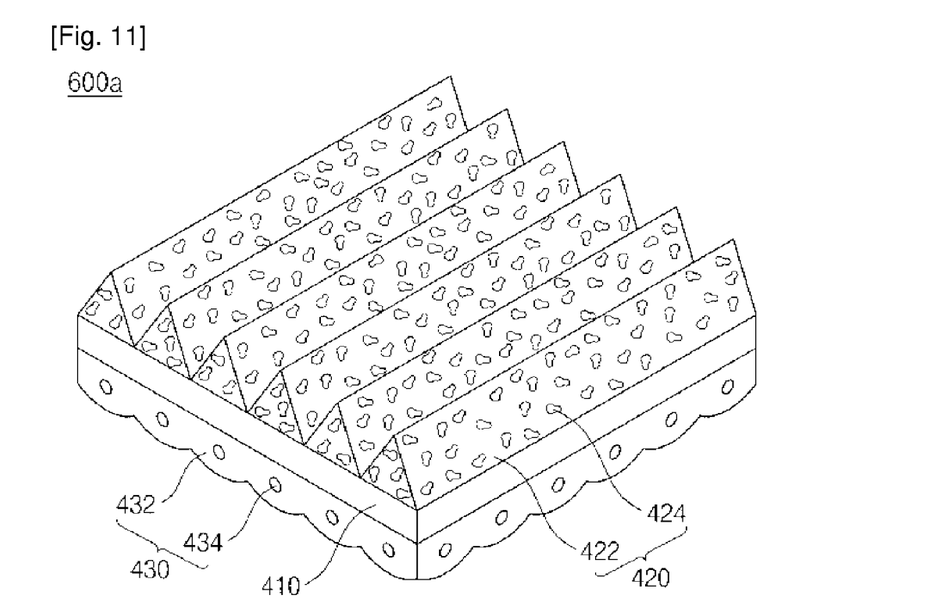
FIGS. 11 and 12 are perspective views schematically showing the structure of an optical film in accordance with another exemplary embodiment of the present invention.
Figure 12:
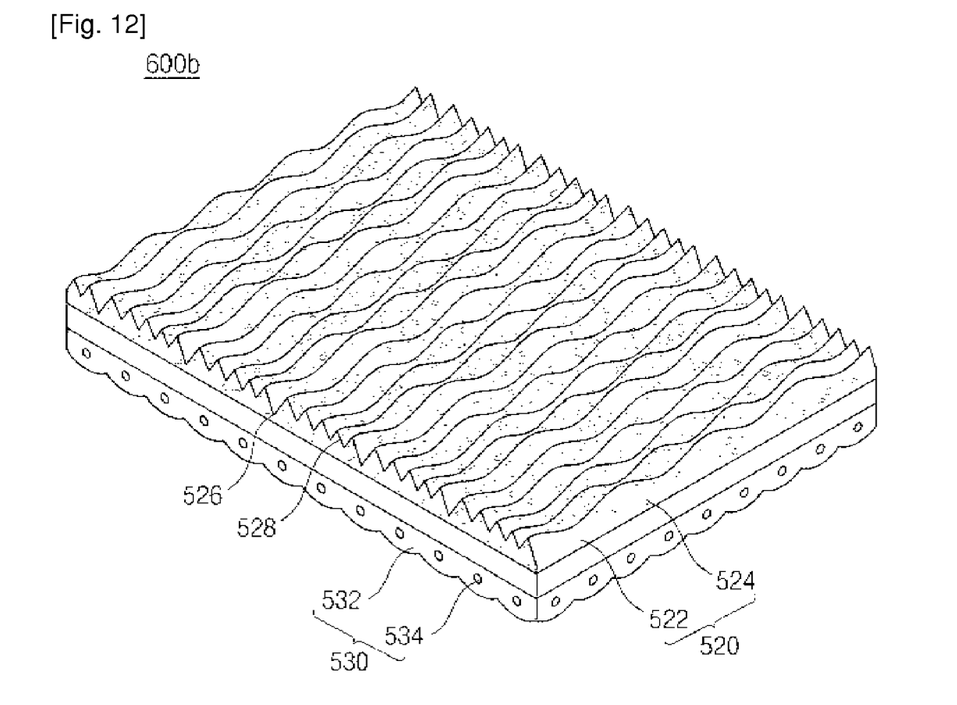

FIGS. 11 and 12 are perspective views schematically showing the structure of an optical film in accordance with another exemplary embodiment of the present invention.

Referring to FIG. 11, an optical film 600a in accordance with another exemplary embodiment of the present invention comprises a base film 410, a plurality of structures 420 formed on the base film 410, and a protection layer 430.

The protection layer 430 is formed on the bottom surface of the base film 410, to improve the heat resistance of the optical film 600a and diffuse the light entering the optical film 600a.

The protection layer 430 may be formed by mixing a plurality of beads 434 with resin 432.

As the resin 432, acryl resin having a good heat resistance and being strong against scratches may be used.

The surface of the protection layer 430 may be a matte surface.

As above, the protection layer 430 prevents the optical film 600a from being deformed by heat generated from a light source 222a and 322. In other words, the optical film 600a is prevented from corrugation by the resin 432 having a strong heat resistance, and has a good recovery force by which even the optical film 600a deformed at a high temperature returns to the original condition of the optical film 600a from an ambient condition.

Further, the protection layer 430 serves to prevent the optical film 600a from having a scratch by an external impact or other physical forces.

The other components of the optical film 600a are identical to those of the above-described optical film 400, so a description thereof will be omitted.

Referring to FIG. 12, an optical film 600b in accordance with another exemplary embodiment of the present invention comprises a base film 510, a plurality of structures 520 formed on the base film 510, and a protection layer 530.

The protection layer 530 is formed on the bottom surface of the base film 510, to improve the heat resistance of the optical film 600b and diffuse the light entering the optical film 600b.

The protection layer 530 may be formed by mixing a plurality of beads 534 with resin 532.

As the resin 532, acryl resin having a good heat resistance and being strong against scratches may be used.

The surface of the protection layer 530 may be a matte surface.

As above, the protection layer 530 prevents the optical film 600b from being deformed by heat generated from a light source 222a and 322. In other words, the optical film 600b is prevented from corrugation by the resin 532 having a strong heat resistance, and has a good recovery force by which even the optical film 600b deformed at a high temperature returns to the original condition of the optical film 600b from an ambient condition.

Further, the protection layer 530 serves to prevent the optical film 600b from having a scratch by an external impact or other physical forces.

The other components of the optical film 600a are identical to those of the above-described optical film 400, so a description thereof will be omitted.

The invention claimed is:

1. An optical film, comprising:
   a base film; and
   a plurality of structures disposed on the base film,
   at least one of the structures comprising a plurality of beads with a diffusion portion having a first diameter and a transmission portion having a second diameter integrally formed with each other,
   wherein the diffusion portion diffuses a light incident through the base film, and the transmission portion transmits the light incident through the base film.

2. The optical film of claim 1, wherein the bead is formed in a snowman shape.

3. The optical film of claim 1, wherein the ratio of the first diameter to the second diameter is substantially 1:1 to 10:1.

4. The optical film of claim 1, wherein at least one of the structures has a continuous curved surface formed along the longitudinal direction of the structures.

5. The optical film of claim 1, wherein the surfaces of the diffusion portion and the transmission portion is covered with a coating film.

6. The optical film of claim 1, wherein the first diameter of the diffusion portion is substantially 0.03 µm to 3 µm, and the entire length of the bead is substantially 0.06 µm to 5 µm.

7. The optical film of claim 1, wherein a cross section of the structure is substantially triangular.

8. The optical film of claim 1, further comprising a protection layer positioned on the bottom of the base film and having a plurality of diffusion particles.

9. An optical film, comprising:
   a base film; and
   a plurality of structures disposed on the base film,
   wherein at least one of the structures comprises a plurality of beads with a diffusion portion having a first diameter and a transmission portion having a second diameter integrally formed with each other,
   wherein the height of at least one of the structures varies at random or regular intervals along the longitudinal direction of the structure,
   wherein the diffusion portion diffuses a light incident through the base film, and the transmission portion transmits the light incident through the base film.

10. The optical film of claim 9, wherein at least one of the structures has a continuous curved surface formed along the longitudinal direction of the structures.

11. A backlight unit, comprising:
    a light source; and
    an optical film on which the light emitted from the light source is incident,
    wherein the optical film comprises a base film and a plurality of structures disposed on the base film,
    at least one of the structures comprising a plurality of beads with a diffusion portion having a first diameter and a transmission portion having a second diameter integrally formed with each other,
    wherein the diffusion portion diffuses a light incident through the base film, and the transmission portion transmits the light incident through the base film.

12. The backlight unit of claim 11, wherein the bead are formed in a snowman shape.

13. The backlight unit of claim 11, wherein the ratio of the first diameter to the second diameter is substantially 1:1 to 10:1.

14. The backlight unit of claim 11, wherein the surfaces of the diffusion portion and the transmission portion is covered with a coating film.

15. The backlight unit of claim 11, further comprising a protection layer positioned on the bottom of the base film and having a plurality of diffusion particles.

16. The backlight unit of claim 11, wherein the height of at least one of the structures varies at random or regular intervals along the longitudinal direction of the structure.

17. The backlight unit of claim 11, wherein at least one of the structures has a continuous curved surface formed along the longitudinal direction of the structures.

18. A liquid crystal display device, comprising:
    a liquid crystal panel;
    a light source; and
    an optical film positioned between the liquid crystal panel and the light source,
    the optical film comprising a base film and a plurality of structures disposed on the base film,
    at least one of the structures comprising a plurality of beads with a diffusion portion having a first diameter and a transmission portion having a second diameter integrally formed with each other,
    wherein the diffusion portion diffuses a light incident through the base film, and the transmission portion transmits the light incident through the base film.

* * * * *